Apr. 17, 1923.                    A. A. WELLS                       1,452,230
                              HIGH POWER DRY BATTERY
                                Filed Jan. 2, 1918
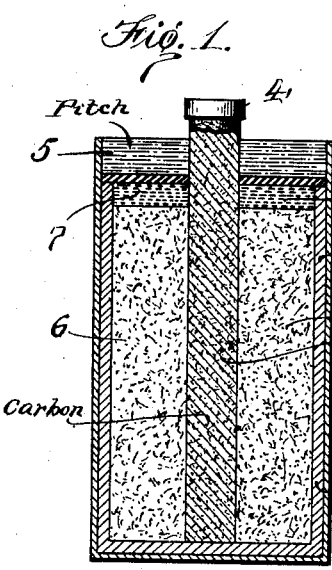
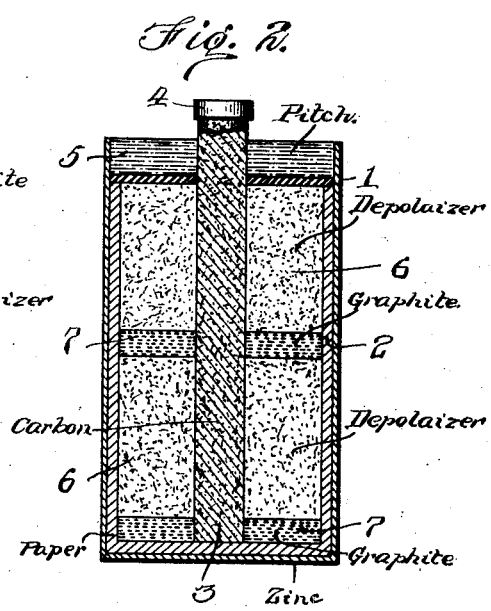
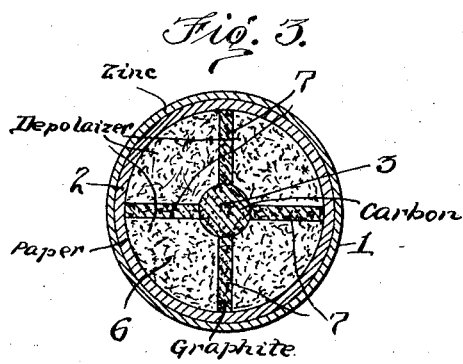

Patented Apr. 17, 1923.

1,452,230

UNITED STATES PATENT OFFICE.

ALFRED A. WELLS, OF MONTCLAIR, NEW JERSEY, ASSIGNOR TO NATIONAL CARBON COMPANY, INC., OF NEW YORK, N. Y., A CORPORATION OF NEW YORK.

HIGH-POWER DRY BATTERY.

Application filed January 2, 1918. Serial No. 209,925.

*To all whom it may concern:*

Be it known that I, ALFRED A. WELLS, a citizen of the United States, and a resident of Montclair, in the county of Essex and State of New Jersey, have invented certain new and useful Improvements in High-Power Dry Batteries, of which the following is a specification.

This invention relates to dry batteries and relates especially to batteries of the Leclanche type composed of a zinc cup having a central carbon pencil or electrode surrounded by a depolarizing mass of carbon and manganese dioxide, but the invention is not wholly restricted to the particular type of battery herein described for illustrative purposes.

In the present invention it is the object to produce a battery having a high amperage or current output and also in some cases to secure a higher voltage. The invention as carried out in its preferred form involves the introduction into some portion of the depolarizing mass of a layer or restricted zone of graphite, carbon or similar conducting material, preferably without any manganese dioxide or other depolarizing agent present (although the latter may be introduced in case the conductivity is not materially affected). The restricted zone of conducting material, which will be hereinafter referred to for illustrative purposes, simply as graphite, may be a layer thereof one-eighth to one-fourth inch or more in thickness, preferably extending from the carbon electrode or pencil to the paper, cloth or other insulating material present between the depolarizing mass and the zinc container. Preferably the layer of graphite is placed over the depolarizing mass and is securely tamped in place, but it is also possible to have such layer in the middle or at the bottom, or elsewhere, in the depolarizing mass. Delaminated graphite is especially useful for the purpose and although of a bulky character, on pressure it packs to a dense mass, appearing almost like a solid block of graphite, and this material fills in compactly around the carbon pencil, making a continuous conducting mass between the latter and the zinc electrode.

A cell or battery may be made up as follows: Using an ordinary zinc cup, a lining may be made of, for example, blotting paper, the carbon pencil placed in the center of the cup and depolarizing material packed around it. For example, 10 parts by weight of manganese dioxide, either the mineral manganese dioxide or the hydrated artificial product, or other suitable form may be admixed with 15 parts of graphite and a small amount of electrolyte, such for example, as a strong solution of ammonium chloride, usually containing zinc chloride, is added in quantity sufficient to dampen the mass. After well mixing, a product is secured which is almost a dry powder but still has moisture enough to give, on tamping, a solid cake. This is packed into the cell around the carbon electrode, filling in the space between it and the paper lining. A small amount of electrolyte is then added. On standing a short time and especially on warming, this additional solution is taken up by the blotting paper thereby giving the latter the necessary charge of activating chemicals. 4 parts by weight of delaminated graphite is then tamped in on the top of the depolarizing mass to yield a thin layer. The cell is sealed with pitch or wax.

In tests which have been made a cell of this character has given approximately twice the amperage of a cell made in the ordinary way and the voltage has been maintained at from 1.5 to 1.4 over a considerable period of the discharge of the battery. When used to light a miniature incandescent bulb, the latter burned for nearly twice as long a period as when a cell of the ordinary type was used.

It is possible to use more than one layer of graphite in the cell, depending on its size and general construction, and also in place of delaminated graphite, ordinary graphite of various grades may be employed, as well as mixtures of graphite and coke, or other form of carbon.

The conducting graphite layer may be arranged in some cases in a vertical fashion instead of being horizontally placed or it may take the form of radial arms projecting from the carbon electrode, but such relatively complicated organizations are usually more or less fragile or changeable and involve difficulties in manufacture as well as increased cost. The use of a simple layer of graphite on top of the depolarizing mass is satisfactory for the present purpose.

The depolarizing mass may be separately molded around the carbon pencil, enclosed in a cloth bag and introduced into the zinc cup and the conducting graphite layer placed on top of the molded depolarizer prepared in this manner, when it is desired to introduce the depolarizer in this form instead of packing it directly into the zinc container.

Referring to the accompanying drawings, Figure 1 is a longitudinal section of a battery showing my invention. Figure 2 is a longitudinal section of another form of my invention, and Figure 3 is a horizontal section of a battery having vertical graphite layers.

In the illustrated embodiment of my invention, I show a battery having an ordinary zinc cup 1, a lining 2, made of blotting paper, a carbon pencil 3 placed in the centre of the cup 1 and depolarizing material 6 packed around such pencil 3. A layer of graphite 7 is then placed on top of the depolarizing material and the battery is sealed with pitch 5. A metallic cap 4 is placed on top of the pencil 3. In Figure 2 I show the horizontal layers of graphite 7 at the middle and bottom of the cell. In Figure 3 I show the graphite bars 7 in vertical position.

Other containers or electrodes of any suitable composition or construction may be used in accordance with the present invention.

What I claim is:—

1. A dry cell comprising a metal container serving as one electrode, a carbon electrode therein, a depolarizing mass comprising conducting carbon and an insoluble oxidizing agent between the carbon electrode and the metal electrode, and localized bodies containing a higher proportion of carbon than the bulk of the depolarizing mass between the two electrodes, whereby internal low-resistance paths are provided.

2. A dry cell comprising a metal container serving as one electrode, a carbon electrode therein, a depolarizing mass comprising conducting carbon and an insoluble oxidizing agent between the carbon electrode and the metal electrode, and localized bodies comprising conductive carbon substantially unmixed with the oxidizing agent between the two electrodes, whereby internal low-resistance paths are provided.

ALFRED A. WELLS.